United States Patent [19]
Payan

[11] Patent Number: 5,425,547
[45] Date of Patent: Jun. 20, 1995

[54] CHRISTMAS TREE SPOTTER

[76] Inventor: Alphons C. Payan, 31120 Corte Anza, Temecula, Calif. 92592

[21] Appl. No.: 223,006

[22] Filed: Apr. 5, 1994

[51] Int. Cl.$^6$ ............................ B62B 1/12; A47G 7/02
[52] U.S. Cl. ........................................ 280/46; 47/40.5; 248/527; 280/47.26; 280/47.33
[58] Field of Search ................. 47/40.5; 248/129, 524, 248/527; 280/43, 46, 43.1, 43.14, 47.16, 47.2, 47.21, 47.24, 47.26, 47.33

[56] References Cited

U.S. PATENT DOCUMENTS

| | | | |
|---|---|---|---|
| D. 290,099 | 6/1987 | Andersson | D11/130.1 |
| 2,266,398 | 12/1941 | Quayle | 280/46 |
| 2,600,720 | 6/1952 | Abramson | 280/46 |
| 3,084,947 | 4/1963 | Booth | 280/43.14 X |
| 3,469,342 | 9/1969 | Morris | 47/40.5 |
| 4,571,881 | 2/1986 | Lathim | 47/40.5 |
| 4,620,813 | 11/1986 | Lacher | 403/93 |
| 4,699,347 | 10/1987 | Kuhnley | 248/516 |
| 5,031,926 | 7/1991 | Wannamaker | 280/47.2 |

*Primary Examiner*—Margaret A. Focarino
*Assistant Examiner*—Michael Mar

[57] ABSTRACT

A Christmas tree spotter for easily and safely moving a fully decorated erect Christmas tree to a display location, generally adjacent a room wall, after the tree has been decorated at a more convenient work location, generally the center of a room, the Christmas tree spotter comprising a hollow inverted frustum-shaped tree trunk receptacle having a plurality of equally spaced apart radial thumbscrews projecting inwardly through the rim thereof for clamping against the trunk of the tree held therein. The receptacle includes a pointed spike projecting upwardly from the bottom thereof for piercing engagement of the cut end of the tree trunk held therein to prevent lateral movement of the trunk end. The receptacle is water-tight so the tree trunk may be immersed in water for preserving tree freshness and reducing fire hazard. Three divergent support legs, two of which have wheels mounted on the lower ends thereof, extend downwardly from the receptacle in tripod form. The third leg has a blunt lower end for frictionally engaging the supporting surface whereby wheeled movement of the spotter is prevented. A wheeled jack assembly is pivotally connected to the lower end of the third leg whereby the third leg may be raised from the supporting surface for wheeled movement of the Christmas tree spotter over the supporting surface.

1 Claim, 4 Drawing Sheets

CHRISTMAS TREE SPOTTER

BACKGROUND OF THE INVENTION

1. Field of the Invention

The present invention relates to tree stands and more particularly pertains to a Christmas tree spotter which may be adapted for easily and safely moving a fully decorated erect Christmas tree to a display location, generally adjacent a room wall, after the tree has been decorated at a more convenient work location, generally the center of a room.

2. Description of the Prior Art

The use of tree stands is known in the prior art. More specifically, tree stands heretofore devised and utilized for the purpose of supporting a tree in an upright position are known to consist basically of familiar, expected and obvious structural configurations, notwithstanding the myriad of designs encompassed by the crowded prior art which have been developed for the fulfillment of countless objectives and requirements.

The present invention is directed to improving devices for supporting a tree in an upright position in a manner which is safe, secure, economical and aesthetically pleasing.

The prior art discloses a Christmas tree stand as shown in U.S. Pat. No. 3,469,342 to Morris which consists of a nonporous tree support cylinder which is connected by a flexible hose to a remote water reservoir. The reservoir is easily refilled with water so that the tree trunk is continuously immersed in water in the cylinder, thereby preserving the freshness of the tree and reducing the fire hazard.

Other related prior art patents include U.S. Pat. Nos. 4,699,347 to Kuhnley, 4,571,881 to Lathim, Des. 290,099 to Andersson, and 4,620,813 to Lacher.

While these devices fulfill their respective, particular objectives and requirements, the aforementioned patents do not disclose a Christmas tree spotter for easily and safely moving a fully decorated erect Christmas tree to a display location, generally adjacent a room wall, after the tree has been decorated at more convenient work location, generally the center of a room. Furthermore, none of the prior art tree stands teach or suggest a way to use wheels attached to the stand to facilitate movement of the tree.

In this respect, the Christmas tree spotter according to the present invention substantially departs from the conventional concepts and designs of the prior art, and in so doing provides an apparatus primarily developed for the purpose of easily and safely moving a fully decorated erect Christmas tree to a display location, generally adjacent a room wall, after the tree has been decorated at a more convenient work location, generally the center of a room.

Therefore, it can be appreciated that there exists a continuing need for a Christmas tree spotter which can be used for easily and safely moving a fully decorated erect Christmas tree to a display location, generally adjacent a room wall, after the tree has been decorated at a more convenient work location, generally the center of a room. In this regard, the present invention substantially fulfills this need.

As illustrated by the background art, efforts are continuously being made in an attempt to develop devices for supporting a tree in an upright position. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of tree stands now present in the prior art, the present invention provides a new tree stand construction wherein the same can be utilized for easily and safely moving a fully decorated erect Christmas tree to a display location, generally adjacent a room wall, after the tree has been decorated at a more convenient work location, generally the center of a room. As such, the general purpose of the present invention, which will be described subsequently in greater detail, is to provide a Christmas tree stand apparatus and method which has all the advantages of the prior art tree stands and none of the disadvantages.

The invention is defined by the appended claims with the specific embodiment shown in the attached drawings. For the purpose of summarizing the invention, the invention may be incorporated into a Christmas tree spotter for easily and safely moving a fully decorated erect Christmas tree to a display location, generally adjacent a room wall, after the tree has been decorated at a more convenient work location, generally the center of a room. The Christmas tree spotter comprises a hollow inverted frustum-shaped tree trunk receptacle having a pointed spike projecting upwardly from the bottom thereof. The spike piercingly engages the cut end of a tree trunk held within the receptacle whereby lateral movement of the trunk end is prevented. The receptacle is water-tight so the tree trunk may be immersed in water for preserving tree freshness and reducing fire hazard. The receptacle also has a cylindrical rim therearound with three equally spaced apart threaded radial holes therethrough. A thumbscrew threadedly engages each of the threaded radial holes for clamping against the trunk of the tree held therein. The receptacle additionally has three divergent support legs extending downwardly in tripod form. Two of the legs have an axle connected between their lower ends with a wheel rotationally connected to each end of the axle whereby the Christmas tree spotter may be easily moved from place to place over a supporting surface. The third leg has a blunt lower end for frictionally engaging the supporting surface whereby wheeled movement of the spotter is prevented. The third leg also has a clevis projecting radially outwardly therefrom proximal the lower end thereof.

A wheeled jack is pivotally connected to the clevis whereby the lower end of the third downwardly extending leg may be raised from the supporting surface for wheeled movement of the Christmas tree spotter over the supporting surface. The wheeled jack comprises a J-shaped member having an integral arcuate fulcrum portion with an integral elongated handle portion extending upwardly from one end thereof. The handle portion has a transverse gripping bar attached to the upper end thereof. The arcuate fulcrum portion also has an integral short first lug portion extending upwardly from the other end thereof, the first lug portion having a transverse hole therethrough proximal the upper end thereof. The arcuate fulcrum portion further has a second lug extending radially downwardly therefrom. A clevis pin extends through the clevis of the third leg. The clevis pin also extends through the transverse hole of the first lug whereby the arcuate fulcrum portion of the jack may be pivoted downwardly toward the supporting surface when the handle portion of the jack is pivoted outwardly away from the third leg. A wheel is operably connected to the second lug such that the wheel contacts the supporting surface to elevate the lower end of the third leg from the supporting surface when the handle portion is pivoted outwardly away from the third leg whereby the Christmas tree spotter may be wheeled from place to place. The wheel means is retractable from the supporting surface by the handle portion being pivoted inwardly toward the third leg whereby the Christmas tree spotter is secured in position by frictional engagement of the blunt end of the third leg with the supporting surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a Christmas tree spotter for easily and safely moving a fully decorated erect Christmas tree to a display location, generally adjacent a room wall, after the tree has been decorated at more convenient work location, generally the center of a room.

It is another object of the present invention to provide a Christmas tree spotter which may be easily and efficiently manufactured and marketed.

It is a further object of the present invention to provide a Christmas tree spotter which is of a durable and reliable construction.

An even further object of the present invention is to provide a Christmas tree spotter which is susceptible of a low cost of manufacture with regard to both materials and labor, and which accordingly is then susceptible of low prices of sale to the consuming public, thereby making such Christmas tree spotters economically available to the buying public.

Still yet another object of the present invention is to provide a Christmas tree spotter which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
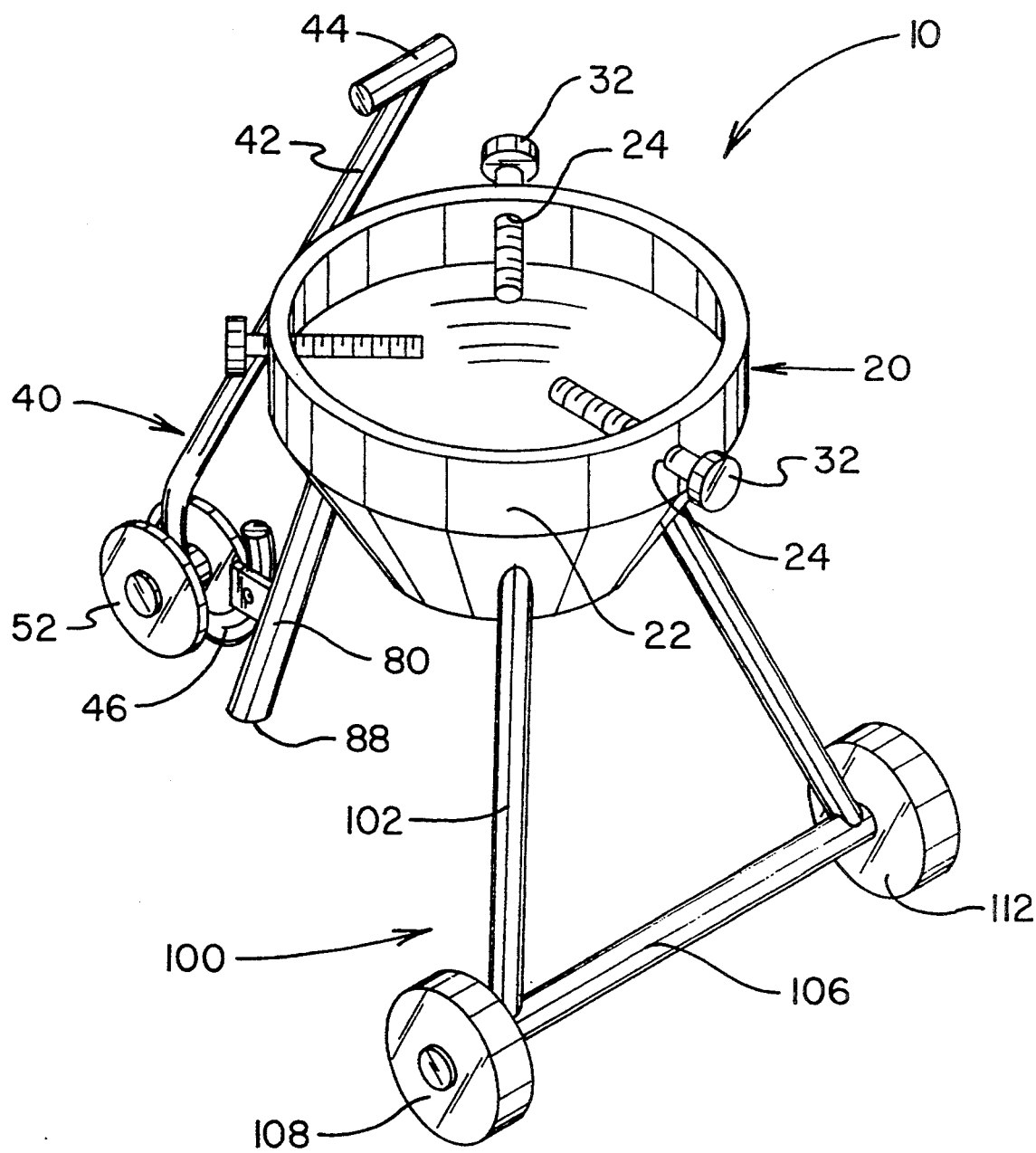
FIG. 1 is a perspective view of the Christmas tree spotter.
Figure 2:
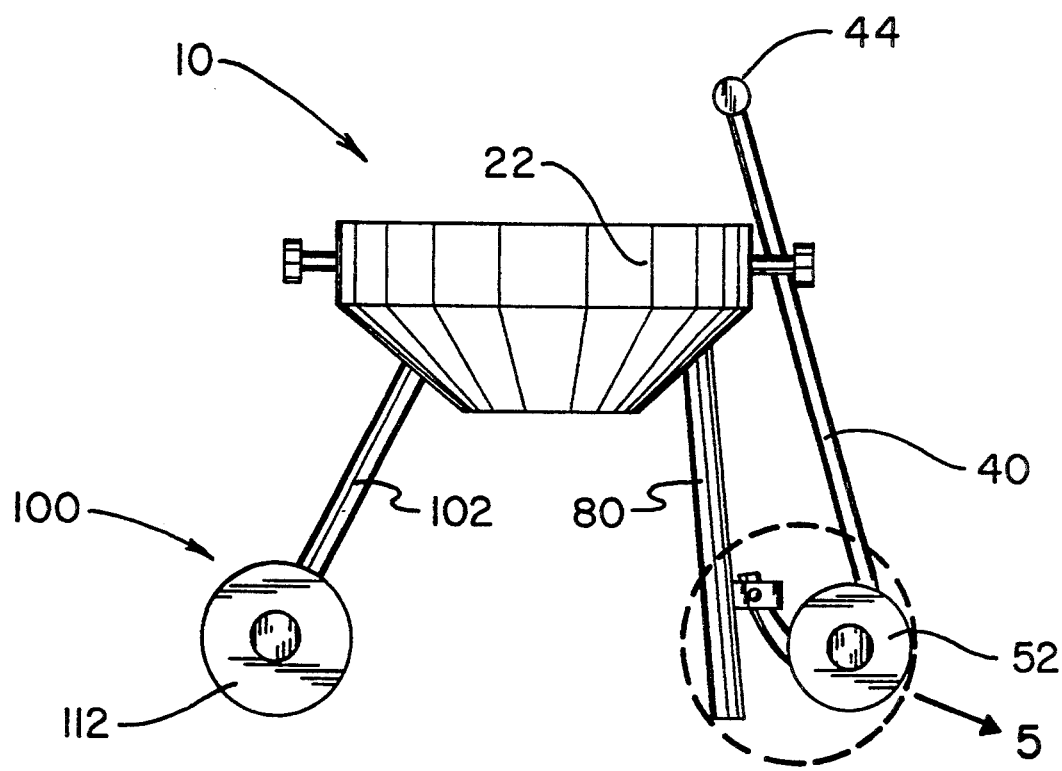
FIG. 2 is a left side elevational view of the present invention.
Figure 3:
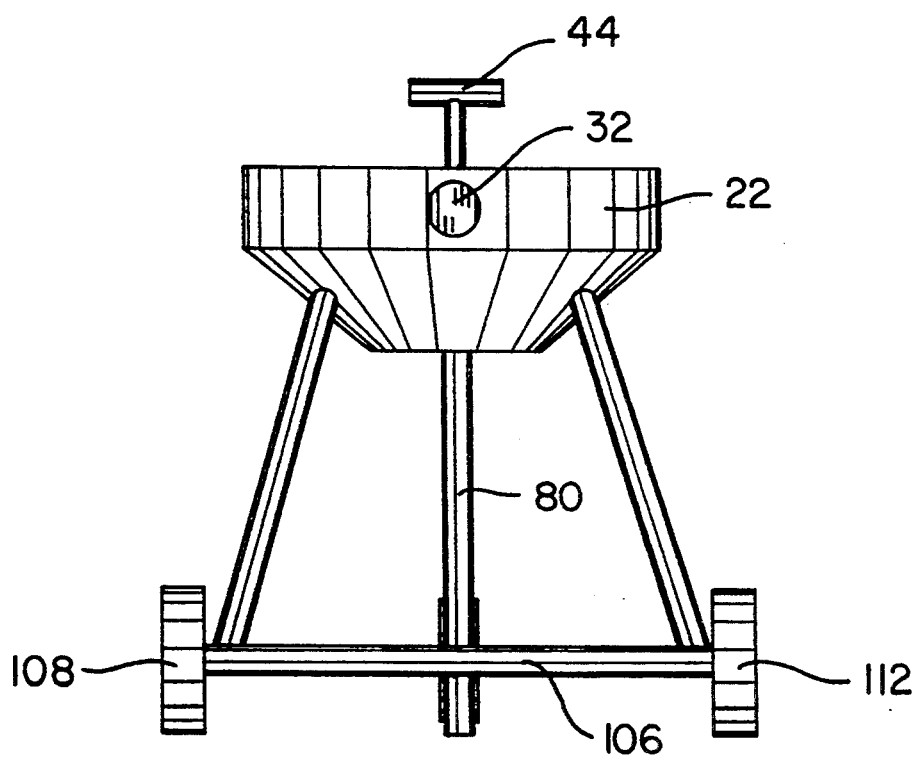
FIG. 3 is a rear elevational view of the invention of FIG. 1.
Figure 4:
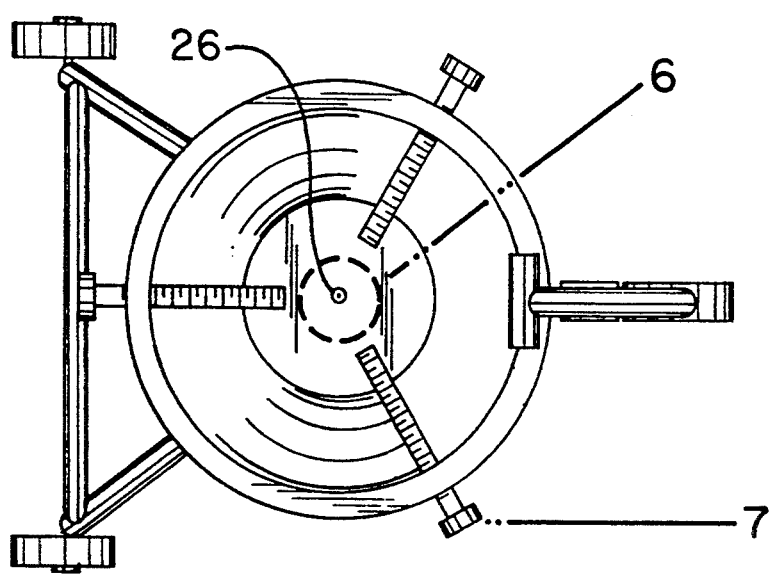
FIG. 4 is a top plan view of the invention of FIG. 1.
Figure 5:
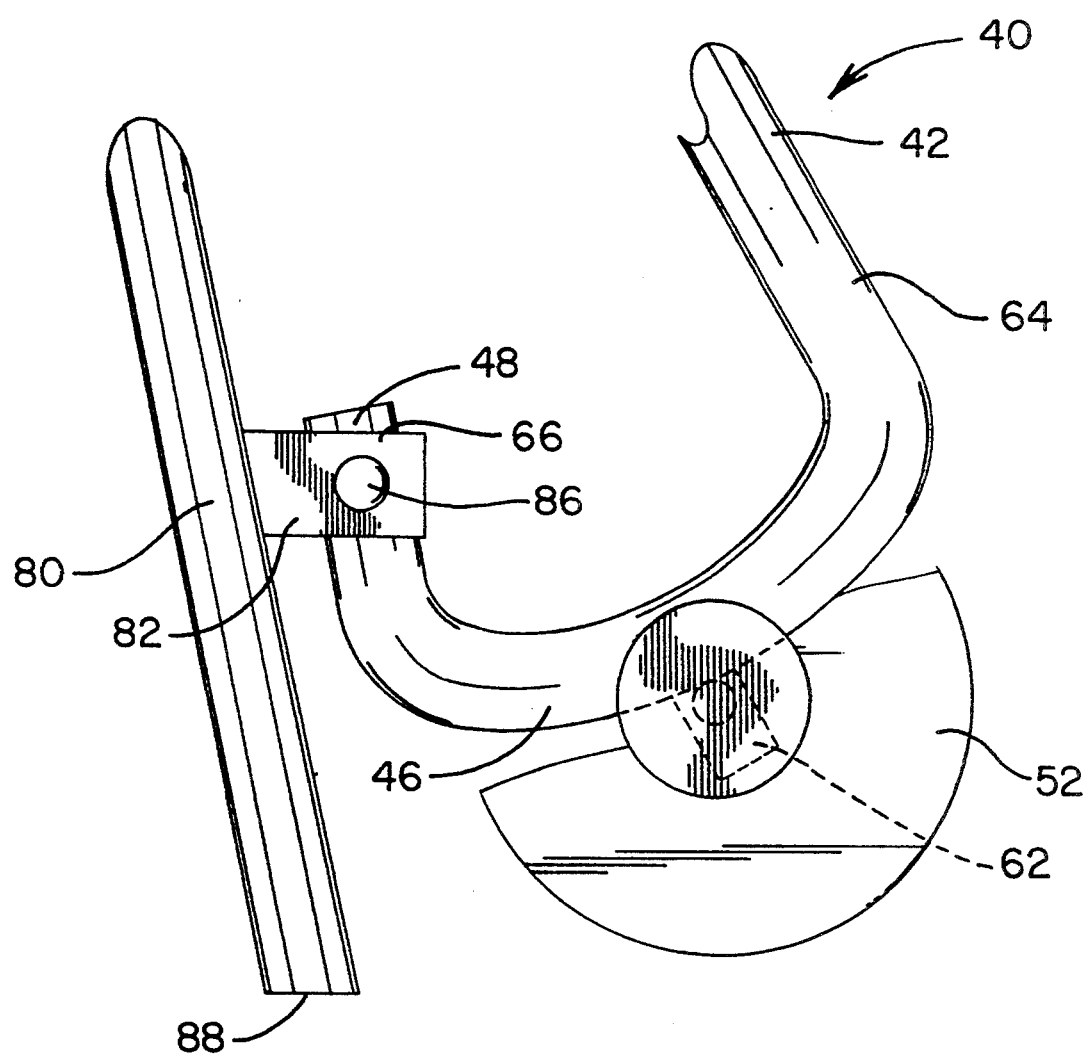
FIG. 5 is a detail view of the manner of construction of the wheeled jack assembly.
Figure 6:
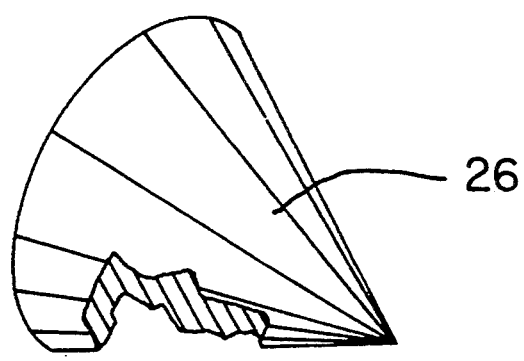
FIG. 6 is a perspective view of the tree trunk engaging spike of the receptacle.
Figure 7:
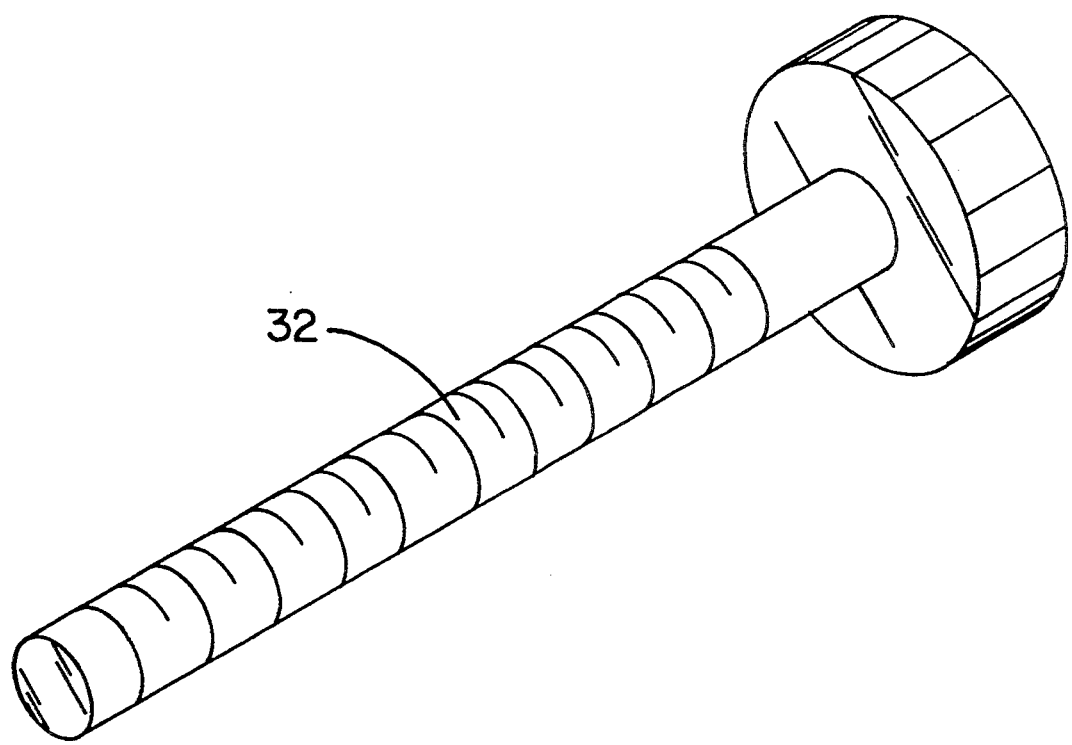
FIG. 7 is a perspective view of a tree trunk clamping thumbscrew of the receptacle.

With reference now to the drawings, and in particular to FIG. 1 thereof, a Christmas tree spotter embodying the principles and concepts of the present invention and generally designated by the reference numeral 10 will be described.

From an overview standpoint, the Christmas tree spotter is adapted for use for easily and safely moving a fully decorated erect Christmas tree to a display location, generally adjacent a room wall, after the tree has been decorated at a more convenient work location, generally the center of a room. See FIG. 1.

With reference now to FIGS. 1-7 and more specifically, it will be noted that a Christmas tree spotter 10 is shown. The Christmas tree spotter 10 comprises a hollow inverted frustum-shaped tree trunk receptacle 20 having a pointed spike 26 projecting upwardly from the bottom thereof. The spike 26 piercingly engages the cut end of a tree trunk held within the receptacle 20 whereby lateral movement of the trunk end is prevented. The receptacle 20 is water-tight so the tree trunk may be immersed in water for preserving tree freshness and reducing fire hazard. The receptacle 20 also has a cylindrical rim 22 therearound with three equally spaced apart threaded radial holes 24 therethrough. A thumbscrew 32 threadedly engages each of the threaded radial holes 24 for clamping against the trunk of the tree held therein. The receptacle 20 additionally has three divergent support legs 80, 102, and 104 extending downwardly in tripod form. Two of the legs 102 and 104 have an axle 106 connected between their lower ends with a wheel 108 and 112 rotationally connected to each end of the axle 106 whereby the Christmas tree spotter 10 may be easily moved from place to place over a supporting surface. The third leg 80 has a blunt lower end 88 for frictionally engaging the supporting surface whereby wheeled movement of the spotter 10 is prevented. The third leg 80 also has a clevis 82 projecting radially outwardly therefrom proximal the lower end thereof.

A wheeled jack 40 is pivotally connected to the clevis 82 whereby the lower end 88 of the third leg 80 may be raised from the supporting surface for wheeled movement of the Christmas tree spotter 10 over the supporting surface. The wheeled jack 40 comprises a J-shaped member 64 having an integral arcuate fulcrum portion 46 with an integral elongated handle portion 42 extending upwardly from one end thereof. The handle portion 42 has a transverse gripping bar 44 attached to the upper end thereof. The arcuate fulcrum portion 46 also has an integral short first lug portion 48 extending upwardly from the other end thereof, the first lug portion 48 having a transverse hole 66 therethrough proximal the upper end thereof. The arcuate fulcrum portion 46 further has a second lug 62 extending radially downwardly therefrom. A clevis pin 86 extends through the clevis 82 of the third leg 80.

The clevis pin 86 also extends through the transverse hole 66 of the first lug portion 48 whereby the arcuate fulcrum portion 46 of the jack 40 may be pivoted downwardly toward the supporting surface when the handle portion 42 of the jack is pivoted outwardly away from the third leg 80. A wheel 52 is operably connected to the second lug 62 such that the wheel 52 contacts the supporting surface to elevate the lower end 88 of the third leg 80 from the supporting surface when the handle portion 42 is pivoted outwardly away from the third leg 80 whereby the Christmas tree spotter 10 may be wheeled from place to place. The wheel 52 is retractable from the supporting surface by the handle portion 42 being pivoted inwardly toward the third leg 80 whereby the Christmas tree spotter 10 is secured in position by frictional engagement of the blunt end 88 of the third leg 80 with the supporting surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A Christmas tree spotter for easily and safely moving a fully decorated erect Christmas tree to a display location, generally adjacent a room wall, after the tree has been decorated at a more convenient work location, generally the center of a room, the Christmas tree spotter comprising:

a hollow inverted frustum-shaped tree trunk receptacle having a pointed spike projecting upwardly from the bottom thereof for piercing engagement of the cut end of a tree trunk held within the receptacle whereby lateral movement of the trunk end is prevented, the receptacle being water-tight so the tree trunk may be immersed in water for preserving tree freshness and reducing fire hazard, the receptacle also having a cylindrical rim therearound with a plurality of equally spaced apart threaded radial holes therethrough, the receptacle additionally having three divergent support legs extending downwardly in tripod form, two of the legs having cooperable wheel means rotationally connected to the lower ends thereof whereby the Christmas tree spotter may be easily moved from place to place over a supporting surface, the third leg having a blunt lower end for frictionally engaging the supporting surface whereby wheeled movement of the spotter is prevented, the third leg also having a clevis projecting radially outwardly therefrom proximal the lower end thereof;

a wheeled jack pivotally connected to the clevis whereby the lower end of the third downwardly extending leg may be raised from the supporting surface for wheeled movement of the Christmas tree spotter over the supporting surface, the wheeled jack comprising a J-shaped member having an integral arcuate fulcrum portion with an integral elongated handle portion extending upwardly from one end thereof, the handle portion having a transverse gripping bar attached to an upper end thereof, the arcuate fulcrum portion also having an integral short first lug portion extending upwardly from an opposite end thereof, the first lug portion having a transverse hole therethrough proximal an upper end thereof, the arcuate fulcrum portion further having a second lug extending radially outwardly and downwardly therefrom; a clevis pin extending through the clevis of the third leg, the clevis pin also extending through the transverse hole of the first lug for pivotally connecting the arcuate fulcrum portion to the clevis whereby the arcuate fulcrum portion of the jack may be pivoted downwardly toward the supporting surface when the handle portion of the jack is pivoted outwardly away from the third leg; wheel means operably connected to the second lug such that the wheel means contacts the supporting surface to elevate the lower end of the third leg from the supporting surface when the handle portion is pivoted outwardly away from the third leg whereby the Christmas tree spotter may be wheeled from place to place, the wheel means being retractable from the supporting surface when the handle portion is pivoted inwardly toward the third leg whereby the Christmas tree spotter is secured in position by frictional engagement of the blunt end of the third leg with the supporting surface; and a thumbscrew threadedly engaged with each of the plurality of threaded radial holes through the cylindrical rim for clamping against the trunk of the tree held therein.

* * * * *